United States Patent
Oshitari et al.

(10) Patent No.: US 9,692,054 B2
(45) Date of Patent: Jun. 27, 2017

(54) ELECTRODE MATERIAL FOR LITHIUM ION SECONDARY BATTERY, ELECTRODE FOR LITHIUM ION SECONDARY BATTERY, AND LITHIUM ION SECONDARY BATTERY

(71) Applicant: SUMITOMO OSAKA CEMENT CO., LTD., Chiyoda-ku, Tokyo (JP)

(72) Inventors: Satoru Oshitari, Tokyo (JP); Masataka Oyama, Tokyo (JP); Ryuuta Yamaya, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 0 days.

(21) Appl. No.: 14/825,442

(22) Filed: Aug. 13, 2015

(65) Prior Publication Data

US 2016/0190583 A1 Jun. 30, 2016

Related U.S. Application Data

(63) Continuation-in-part of application No. 14/670,929, filed on Mar. 27, 2015.

(30) Foreign Application Priority Data

Dec. 26, 2014 (JP) ................................. 2014-264897

(51) Int. Cl.

| | |
|---|---|
| *H01M 4/134* | (2010.01) |
| *H01M 4/36* | (2006.01) |
| *H01M 4/58* | (2010.01) |
| *H01M 4/583* | (2010.01) |
| *H01M 4/131* | (2010.01) |
| *H01M 4/62* | (2006.01) |
| *H01M 10/052* | (2010.01) |

(52) U.S. Cl.
CPC ......... *H01M 4/5825* (2013.01); *H01M 4/131* (2013.01); *H01M 4/366* (2013.01); *H01M 4/625* (2013.01); *H01M 10/052* (2013.01)

(58) Field of Classification Search
CPC .... H01M 4/5825; H01M 4/625; H01M 4/366; H01M 10/0525; C01B 25/45
See application file for complete search history.

(56) References Cited

U.S. PATENT DOCUMENTS

2013/0140496 A1* 6/2013 Nuspl .................. C01B 25/45
 252/507

FOREIGN PATENT DOCUMENTS

| CA | 2788038 A1 | 8/2011 |
|---|---|---|
| JP | A-2004-063422 | 2/2004 |
| JP | A-2013-101883 | 5/2013 |
| JP | A-2013-518023 | 5/2013 |
| JP | A-2013-518378 | 5/2013 |
| WO | WO 2010/082402 A1 | 7/2010 |
| WO | WO 2011/092281 A1 | 8/2011 |
| WO | WO 2014/185494 A1 | 11/2014 |

OTHER PUBLICATIONS

Office Action for Japanese Patent Application No. 2014-264897 (mailed Apr. 21, 2015).
Extended Search Report for European Patent Application No. 15161095.3 (mailed Jun. 10, 2015).

* cited by examiner

*Primary Examiner* — Brittany Raymond
(74) *Attorney, Agent, or Firm* — Merchant & Gould P.C.

(57) ABSTRACT

There are provided an electrode material for a lithium ion secondary battery having a high discharge capacity and a high mass energy density at a low temperature or at a high-speed charge and discharge, an electrode for a lithium ion secondary battery, and a lithium ion secondary battery. An electrode material for a lithium ion secondary battery of the present invention includes an electrode active material made of $LiFe_xMn_{1-x-y}M_yPO_4$ ($0.220 \leq x \leq 0.350$, $0.0050 \leq y \leq 0.018$) in which M is either or both of Co and Zn, the electrode material has an orthorhombic crystal structure, a space group is Pnma, values of crystal lattice constants a, b, and c satisfy $10.28$ Å$\leq a \leq 10.42$ Å, $6.000$ Å$\leq b \leq 6.069$ Å, and $4.710$ Å$\leq c \leq 4.728$ Å, and lattice volume V satisfies $289.00$ Å$^3 \leq V \leq 298.23$ Å$^3$.

8 Claims, No Drawings

ELECTRODE MATERIAL FOR LITHIUM ION SECONDARY BATTERY, ELECTRODE FOR LITHIUM ION SECONDARY BATTERY, AND LITHIUM ION SECONDARY BATTERY

This application is a continuation-in-part of U.S. patent application Ser. No. 14/670,929, filed 27 Mar. 2015, now abandoned, which claims the benefit of priority to Japanese Patent Application No. 2014-264897 filed Dec. 26, 2014, the disclosures of all of which are hereby incorporated by reference in their entities.

BACKGROUND OF THE INVENTION

Field of the Invention

The present invention relates to an electrode material for a lithium ion secondary battery, an electrode for a lithium ion secondary battery, and a lithium ion secondary battery.

Description of Related Art

Electrode materials made of $LiMnPO_4$ are materials allowing anticipation of a higher battery reaction voltage and an approximately 20% higher energy density (mass energy density) than electrode materials made of $LiFePO_4$. Therefore, electrode materials made of $LiMnPO_4$ are anticipated to be developed for use in electric vehicle-oriented secondary batteries.

However, in a lithium ion secondary battery with a positive electrode including an electrode material made of $LiMnPO_4$, due to the low electron conductivity of $LiMnPO_4$ bulk, the low Li diffusivity of the $LiMnPO_4$ bulk, and the Jahn-Teller effect of manganese ions ($Mn^{2+}$), the volume of $LiMnPO_4$ crystals significantly changes in an anisotropic manner as a battery reaction proceeds. Therefore, in a lithium ion secondary battery with the above-described constitution, the activation energy for intercalating and deintercalating lithium ions into and from the positive electrode increases. As a result, the battery characteristics of the lithium ion secondary battery at a low temperature significantly degrade.

In order to improve the battery characteristics of the lithium ion secondary battery at a low temperature, active studies are underway regarding $LiFe_xMn_{1-x}PO_4$ ($0<x<1$) obtained by substituting some of Mn by Fe in $LiMnPO_4$ (for example, refer to Japanese Unexamined Application, First Publication No. 2013-101883). In $LiFe_xMn_{1-x}PO_4$, since Fe forms a solid solution, the electron conductivity in particles improves more than in $LiMnPO_4$. As a result, in a lithium ion secondary battery with a positive electrode including an electrode material made of $LiFe_xMn_{1-x}PO_4$, the charge and discharge performance improves.

However, there has been no report regarding examples in which an electrode material capable of realizing lithium ion secondary batteries having excellent battery characteristics, for example, at a low temperature and at a high-speed charge and discharge are obtained using the method described in Japanese Unexamined Application, First Publication No. 2013-101883.

Studies are underway regarding $LiFe_xMn_{1-x-y}M_yPO_4$ which is obtained by substituting Mn by a bivalent metal in $LiFe_xMn_{1-x}PO_4$ to obtain a high energy density in the case in which $LiFe_xMn_{1-x}PO_4$ is used as an electrode material by further improving electrical characteristics of $LiFe_xMn_{1-x}PO_4$ (for example, refer to Published Japanese Translation No. 2013-518378 of the PCT International Publication and Published Japanese Translation No. 2013-518023 of the PCT International Publication).

SUMMARY OF THE INVENTION

However, even with the electrode materials described in Published Japanese Translation No. 2013-518378 of the PCT International Publication and Published Japanese Translation No. 2013-518023 of the PCT International Publication, an electrode material having satisfactory battery characteristics cannot be obtained and further improvement has been required.

The present invention has been made in consideration of the above-described circumstances, and an object of the present invention is to provide an electrode material for a lithium ion secondary battery having a high discharge capacity and a high mass energy density at a low temperature or at a high-speed charge and discharge, an electrode for a lithium ion secondary battery including the electrode material for a lithium ion secondary battery, and a lithium ion secondary battery including the electrode for a lithium ion secondary battery.

As a result of intensive studies to solve the above-described problem, the present inventors found that, the electron conductivity can be improved by substituting Mn in $LiFe_xMn_{1-x}PO_4$ having a small amount of Fe substituted (the amount of Fe substituted is less than 50%) by an extremely small amount of a third element M, that is, either or both of Co and Zn which are elements that are electrochemically inactive in a voltage range of 1.0 V to 4.3 V and have a smaller ionic radius than Mn, and the ionic conductivity can be improved by setting the crystal lattice constant in a predetermined range. In addition, when the crystal lattice constant is set to be in a predetermined range by further substituting some of Mn in $LiFe_xMn_{1-x}PO_4$ by either or both of Co and Zn as described above, it is possible to decrease the crystal lattice volume and limit the expansion and shrinkage of the lattice volume caused by the change in the valence of transition metal elements during charging and discharging.

In order to realize lithium ion secondary batteries having excellent battery characteristics at a low temperature, it is assumed that 50% or more of Mn in $LiMnPO_4$ needs to be substituted by Fe. In lithium ion secondary batteries for which an electrode material made of $LiFe_xMn_{1-x}PO_4$ including a larger amount of Fe is used (hereinafter, referred to as "lithium ion secondary battery A"), the charge and discharge capacity increases more than in lithium ion secondary batteries for which an electrode material made of $LiMnPO_4$ is used (hereinafter, referred to as "lithium ion secondary battery B"). However, in the lithium ion secondary battery A, the proportion of a battery reaction at a high voltage derived from $LiMnPO_4$ decreases and the proportion of a battery reaction derived from $LiFePO_4$ increases. Therefore, from the lithium ion secondary battery A, it is not possible to obtain the mass energy density improvement effect which is anticipated from the inclusion of $LiMnPO_4$ in the electrode (positive electrode).

On the other hand, the lithium ion secondary battery B or lithium ion secondary batteries for which an electrode material made of $LiFe_xMn_{1-x}PO_4$ ($0<x<1$) is used, in which a smaller amount of Mn is substituted by Fe than in the lithium ion secondary battery A, have a problem in that a favorable discharge capacity or a favorable mass energy density cannot be obtained, particularly, at a low temperature or at a high-speed charge and discharge due to the low electron conductivity of the LiMnPO$_4$ bulk, the low Li diffusivity of the LiMnPO$_4$ bulk, and the Jahn-Teller effect of Mn$^{2+}$ described above.

However, according to a material in which the crystal lattice constant is set to be in a predetermined range by further substituting some of Mn in LiFe$_x$Mn$_{1-x}$PO$_4$ by either or both of Co and Zn, it was found that an effect with which the activation energy for intercalating and deintercalating Li is decreased during a battery reaction can be obtained by improving the electron conductivity and Li diffusivity of the bulk and alleviating the Jahn-Teller effect. Further, it is also possible to significantly improve low-temperature characteristics and high-speed charge and discharge characteristics without impairing the high material energy density of LiFe$_x$Mn$_{1-x}$PO$_4$ more than necessary. Thereby, the present inventors and the like completed the present invention.

That is, an electrode material for a lithium ion secondary battery of the present invention is an electrode material for a lithium ion secondary battery including an electrode active material made of LiFe$_x$Mn$_{1-x-y}$M$_y$PO$_4$ (0.220≤x≤0.350, 0.005≤y≤0.018), in which the M is either or both of Co and Zn, a space group of a crystal structure in the electrode active material is Pnma, values of crystal lattice constants a, b, and c satisfy 10.28 Å≤a≤10.42 Å, 6.000 Å≤b≤6.069 Å, and 4.710 Å≤c≤4.728 Å, and lattice volume V satisfies 289.00 Å$^3$≤V≤298.23 Å$^3$.

An electrode for a lithium ion secondary battery of the present invention is an electrode for a lithium ion secondary battery including an electrode collector and an electrode mixture layer formed on the electrode collector, in which the electrode mixture layer includes the electrode material for a lithium ion secondary battery of the present invention.

A lithium ion secondary battery of the present invention includes the electrode for a lithium ion secondary battery of the present invention.

According to the electrode material for a lithium ion secondary battery of the present invention, since the electron conductivity and the ionic conductivity improve, it is possible to realize a lithium ion secondary battery having a high discharge capacity and a high mass energy density at a low temperature or at a high-speed charge and discharge.

According to the electrode for a lithium ion secondary battery of the present invention, since the electrode material for a lithium ion secondary battery of the present invention is included, it is possible to obtain an electrode for a lithium ion secondary battery having a high discharge capacity and a high mass energy density at a low temperature or at a high-speed charge and discharge.

According to the lithium ion secondary battery of the present invention, since the electrode for a lithium ion secondary battery of the present invention is included, it is possible to obtain a lithium ion secondary battery having a high discharge capacity and a high mass energy density at a low temperature or at a high-speed charge and discharge.

DETAILED DESCRIPTION OF THE INVENTION

Embodiments of an electrode material for a lithium ion secondary battery, an electrode for a lithium ion secondary battery, and a lithium ion secondary battery of the present invention will be described.

The present embodiments are specific descriptions for better understanding of the gist of the invention and, unless particularly otherwise described, the present embodiments do not limit the present invention.

Electrode Material for Lithium Ion Secondary Battery

An electrode material for a lithium ion secondary battery of the present embodiment is an electrode material for a lithium ion secondary battery including an electrode active material made of LiFe$_x$Mn$_{1-x-y}$M$_y$PO$_4$ (0.220≤x≤0.350, 0.0050≤y≤0.018), in which M is either or both of Co and Zn, a crystal structure is orthorhombic, a space group is Pnma, values of crystal lattice constants a, b, and c satisfy 10.28 Å≤a≤10.42 Å, 6.000 Å≤b≤6.069 Å, and 4.710 Å≤c≤4.728 Å, and lattice volume V satisfies 289.00 Å$^3$≤V≤298.23 Å$^3$.

The electrode material for a lithium ion secondary battery of the present embodiment is mainly used as an electrode material for a lithium ion secondary battery.

In the electrode material for a lithium ion secondary battery of the present embodiment, the surfaces of the primary particles of the electrode active material made of LiFe$_x$Mn$_{1-x-y}$M$_y$PO$_4$ are coated with a carbonaceous film.

The average primary particle diameter of the primary particles of the electrode active material made of LiFe$_x$Mn$_{1-x-y}$M$_y$PO$_4$ is preferably in a range of 50 nm to 400 nm and more preferably in a range of 80 nm to 260 nm.

The reasons for setting the average primary particle diameter of LiFe$_x$Mn$_{1-x-y}$M$_y$PO$_4$ particles in the above-described range are as described below. When the average primary particle diameter of the LiFe$_x$Mn$_{1-x-y}$M$_y$PO$_4$ particles is less than 50 nm, the particles are too small and it becomes difficult to favorable hold crystallinity, and consequently, it is difficult to obtain LiMnPO$_4$ particles having a length of a crystal lattice in the b axial direction specifically shortened while the lengths of the crystal lattice of the LiFe$_x$Mn$_{1-x-y}$M$_y$PO$_4$ particles in the a axial direction and the c axial direction are maintained to be large. On the other hand, when the average primary particle diameter of the LiFe$_x$Mn$_{1-x-y}$M$_y$PO$_4$ particles exceeds 400 nm, the minimization of the LiFe$_x$Mn$_{1-x-y}$M$_y$PO$_4$ particles may be insufficient and, consequently, it is difficult to obtain extremely small LiFe$_x$Mn$_{1-x-y}$M$_y$PO$_4$ particles having favorable crystallinity.

The thickness of the carbonaceous film is preferably in a range of 1 nm to 12 nm.

The reasons for setting the thickness of the carbonaceous film in the above-described range are as described below. When the thickness is less than 1 nm, the thickness of the carbonaceous film is too thin, thus, it is difficult to form a film having a desired resistance value, consequently, the conductive properties degrade, and it is difficult to ensure conductive properties suitable for the electrode material. On the other hand, when the thickness of the carbonaceous film exceeds 12 nm, the battery activity, for example, the battery capacity of the electrode material per unit mass may decrease.

The average primary particle diameter of the primary particles of the electrode active material made of LiFe$_x$Mn$_{1-x-y}$M$_y$PO$_4$ coated with the carbonaceous film is preferably in a range of 65 nm to 400 nm and more preferably in a range of 75 nm to 270 nm.

The reason for setting the average primary particle diameter of the primary particles of the electrode active material made of LiFe$_x$Mn$_{1-x-y}$M$_y$PO$_4$ coated with the carbonaceous film in the above-described range is as described below. When the average primary particle diameter is less than 65 nm, the specific surface area of the complex particles of a carbonaceous electrode active material increases, and thus, the necessary mass of carbon increases, the charge and discharge capacity decreases, and carbon coating may be difficult. That is, it is difficult to obtain primary particles having a sufficient coating ratio. Thereby, it is difficult to obtain a favorable discharge capacity or a favorable mass energy density, particularly, at a low temperature or at a high-speed charge and discharge. On the other hand, when the average primary particle diameter exceeds 400 nm, it takes a long time for lithium ions or electrons to migrate in the complex particles of the carbonaceous electrode active material, thus, the internal resistance increases, and the output characteristics may deteriorate, which is not preferable.

The shape of the primary particle of the electrode active material made of $LiFe_xMn_{1-x-y}M_yPO_4$ coated with the carbonaceous film is not particularly limited, but is preferably spherical because it is easy to generate an electrode material made of spherical, particularly truly spherical, particles.

The reason for the shape of the primary particle to be preferably spherical is that, when an electrode material paste for the electrode material for a lithium ion secondary battery is prepared by mixing the primary particles of the electrode active material coated with the carbonaceous film, a binding agent, and a solvent together, it is possible to decrease the amount of the solvent. It also becomes easy to apply the electrode material paste for the electrode material for a lithium ion secondary battery to a collector. In addition, when the shape is spherical, the surface area of the primary particles of the electrode active material is minimized, furthermore, it is possible to minimize the mixing amount of the binding agent being added. It is possible to decrease the internal resistance in the obtained electrode.

Furthermore, when the shape of the primary particle of the electrode active material is set to be spherical, particularly truly spherical, it is easy to closely pack the electrode active material, and thus the amount of the electrode material for a lithium ion secondary battery loaded per unit volume increases. Consequently, it is possible to increase the electrode density, and increase the capacity of the lithium ion battery, which is preferable.

The amount of carbon included in the electrode material for a lithium ion secondary battery of the present embodiment is preferably in a range of 0.5% by mass to 5.0% by mass, and more preferably in a range of 0.8% by mass to 2.5% by mass.

The reasons for setting the amount of carbon included in the electrode material for a lithium ion secondary battery of the present embodiment in the above-described range are as described below. When the amount of carbon is less than 0.5% by mass, in a case in which a battery is formed, the discharge capacity at a high-speed charge and discharge rate may decrease, and it becomes difficult to realize sufficient charge and discharge rate performance. On the other hand, when the amount of carbon exceeds 5.0% by mass, the amount of carbon is too large, and thus the battery capacity of a lithium ion battery per unit mass of the primary particle of the electrode active material may decrease more than necessary.

The supporting amount of carbon with respect to the specific surface area of the primary particles of the electrode active material ([the supporting amount of carbon]/[the specific surface area of the primary particles of the electrode active material]) is preferably in a range of 0.04 to 0.40, and more preferably in a range of 0.07 to 0.30.

The reasons for setting the supporting amount of carbon in the electrode material for a lithium ion secondary battery of the present embodiment in the above-described range are as described below. When the supporting amount of carbon is less than 0.04, in a case in which a battery is formed, the discharge capacity at a high-speed charge and discharge rate may decrease, and it becomes difficult to realize sufficient charge and discharge rate performance. On the other hand, when the supporting amount of carbon exceeds 0.40, the amount of carbon is too large, and thus the battery capacity of the lithium ion battery per unit mass of the primary particle of the electrode active material may decrease more than necessary.

The specific surface area of the electrode material for a lithium ion secondary battery of the present embodiment is preferably in a range of 8 $m^2/g$ to 18 $m^2/g$, and more preferably in a range of 10 $m^2/g$ to 15 $m^2/g$.

The reasons for setting the specific surface area of the electrode material for a lithium ion secondary battery of the present embodiment in the above-described range are as described below. When the specific surface area is less than 8 $m^2/g$, it may take a long time for lithium ions or electrons to migrate in the complex particles of the carbonaceous electrode active material, thus, the internal resistance may increase, and the output characteristics may deteriorate, which is not preferable. On the other hand, when the specific surface area exceeds 18 $m^2/g$, the specific surface area of the complex particles of a carbonaceous electrode active material increases, and thus, the necessary mass of carbon increases, and the charge and discharge capacity may decrease, which is not preferable.

Electrode Active Material

The electrode active material is made of $LiFe_xMn_{1-x-y}M_yPO_4$ ($0.220 \leq x \leq 0.350$, $0.0050 \leq y \leq 0.018$) having a crystal structure that is preferable for the diffusion of Li.

In $LiFe_xMn_{1-x-y}M_yPO_4$, the reasons for x to satisfy $0.220 \leq x \leq 0.350$ are as described below.

Since Fe develops the charge and discharge capacity at a voltage of near 3.5 V, compared with Co or Zn, a decrease in the mass energy density caused by the formation of the solid solution is moderate. Therefore, when a relatively large amount of x of 0.350 or less is set, the improvement of low-temperature characteristics can be anticipated with no excessive decrease in the mass energy density.

On the other hand, Fe can decrease the volume resistance of the electrode active material while maintaining high voltage through the formation of the solid solution of Fe. Therefore, when x is set to 0.220 or more, charge and discharge are easy and the output characteristics or low-temperature characteristics can be improved. Furthermore, Fe is a carbonization catalyst element, and the output characteristics or low-temperature characteristics can be improved by bettering the coatability of the carbonaceous film through the formation of the solid solution of Fe.

The reasons for y in $LiFe_xMn_{1-x-y}M_yPO_4$ to satisfy $0.005 \leq y \leq 0.018$ are as described below.

Co or Zn is an element that has a smaller ionic radius than Mn and when Co or Zn is substituted by Mn, the packing density of the crystal lattice of the positive active material can be increased. Therefore, when y is set to 0.005 or more, a strong effect of improving electron conductivity, the Li diffusivity, and the activation energy of an intercalation and deintercalation reaction of lithium ions ($Li^+$) can be anticipated.

On the other hand, Co or Zn is an element that is electrochemically inactive in a voltage range of 1.0 V to 4.3 V and when a large amount of Co or Zn forms a solid solution, the charge and discharge capacity and the mass energy density significantly decrease. Therefore, a relatively small amount of y of 0.018 or less is set, and thus the low-temperature characteristics can be sufficiently improved with no excessive decrease in the mass energy density.

In the present invention, as described above, the amount of solid solution is set according to characteristics of each element of Fe, Co and Zn. In addition, the effect is confirmed in examples which will be described later.

In $LiFe_xMn_{1-x-y}M_yPO_4$, M is an element that is electrochemically inactive in a voltage range of 1.0 V to 4.3 V. It is preferable that the element that is electrochemically inactive in a voltage range of 1.0 V to 4.3 V specifically refers to an element that constitutes the lithium ion secondary battery, and does not change in terms of the valence even in a case in which the voltage is changed in a range of 1.0 V to 4.3 V, and thus, remains divalent, and does not contribute to the development of the charge and discharge capacity.

The M may be:

(1) only Co which is an element having a smaller ionic radius than Mn; or (2) both Co and Zn which is an element having a smaller ionic radius than Mn.

When the M is either or both of Co and Zn, the y preferably satisfies $0.005 \leq y \leq 0.018$, and more preferably satisfies $0.01 \leq y \leq 0.015$.

In the electrode material for a lithium ion secondary battery of the present embodiment, when some of Mn is substituted by either or both of Co and Zn, in $LiFe_xMn_{1-x-y}M_yPO_4$ ($0.220 \leq x \leq 0.350$, $0.005 \leq y \leq 0.018$), the electron conductivity and Li diffusivity of the bulk, and the activation energy of the intercalation and deintercalation reaction of lithium ions can be improved, and characteristics such as the output characteristics or the low-temperature characteristics can be improved.

When the M is both Co and Zn, the amount of Co is preferably larger than the amount of Zn.

In $LiFe_xMn_{1-x-y}M_yPO_4$, the crystal structure is orthorhombic and the space group is Pnma. The reason for setting the values of the crystal lattice constants a, b, and c of $LiFe_xMn_{1-x-y}M_yPO_4$ to satisfy $10.28 \text{ Å} \leq a \leq 10.42 \text{ Å}$, $6.000 \text{ Å} \leq b \leq 6.069 \text{ Å}$, and $4.710 \text{ Å} \leq c \leq 4.728 \text{ Å}$ is that, in the above-described ranges, the lengths of the crystal lattice of the $LiFe_xMn_{1-x-y}M_yPO_4$ particles in the a axial direction and the c axial direction are large, and the length of the crystal lattice of the $LiFe_xMn_{1-x-y}M_yPO_4$ particles in the b axial direction is specifically short.

The values of the crystal lattice constants a, b, and c of $LiFe_xMn_{1-x-y}M_yPO_4$ are values computed from X-ray diffraction patterns.

The reason for setting the volume of the crystal lattice of $LiFe_xMn_{1-x-y}M_yPO_4$, that is, the lattice volume V to satisfy $289.00 \text{ Å}^3 \leq V \leq 298.23 \text{ Å}^3$ is that, in the above-described range, the distance between elements in the structure becomes appropriate and the electron conductivity and Li diffusivity of the bulk can be improved. In a case in which the distance between elements in the structure is too close, the trade of electrons between elements becomes favorable and thus the electron conductivity becomes favorable, but the gap between the elements which serves as the migration path of Li becomes narrow and thus the Li diffusivity deteriorates. In a case in which the distance between elements in the structure is too far, the gap between the elements which serves as the migration path of Li becomes wide and thus the Li diffusivity improves, but the trade of electrons between elements becomes difficult and thus the electron conductivity deteriorates.

In a lithium ion secondary battery including an electrode for a lithium ion secondary battery produced by forming an electrode mixture layer on an electrode collector using the electrode material for a lithium ion secondary battery of the present embodiment, the ratio of the 0.1 CA discharge capacity measured at 0° C. to the 0.1 CA discharge capacity measured at 25° C. is preferably 80% or more, and more preferably 85% or more.

When the ratio of the 0.1 CA discharge capacity measured at 0° C. to the 0.1 CA discharge capacity measured at 25° C. is 80% or more, for example, in a case in which the lithium ion secondary battery is used in a cold district, it becomes possible to use the lithium ion secondary battery for a long period of time with no difference from a case in which the lithium ion secondary battery is used in a warm district. On the other hand, when the ratio of the 0.1 CA discharge capacity measured at 0° C. to the 0.1 CA discharge capacity measured at 25° C. is less than 80%, for example, in a case in which the lithium ion secondary battery is used in a cold district, the lithium ion secondary battery may be used only for an extremely short period of time compared with a case in which the lithium ion secondary battery is used in a warm district, which is not preferable.

In a lithium ion secondary battery including an electrode for a lithium ion secondary battery produced by forming an electrode mixture layer on an electrode collector using the electrode material for a lithium ion secondary battery of the present embodiment, the 0.1 CA discharge capacity measured at 0° C. is preferably 120 mAh/g or more, and more preferably 125 mAh/g or more.

When the 0.1 CA discharge capacity measured at 0° C. is 120 mAh/g or more, for example, even in a case in which the lithium ion secondary battery is used in a cold district, the lithium ion secondary battery has a sufficient battery capacity and thus it becomes possible to use the lithium ion secondary battery for a long period of time. On the other hand, when the 0.1 CA discharge capacity measured at 0° C. is less than 120 mAh/g, for example, in a case in which the lithium ion secondary battery is used in a cold district, the lithium ion secondary battery may have an insufficient battery capacity and thus it is difficult to use the lithium ion secondary battery for a long period of time.

In a lithium ion secondary battery including an electrode for a lithium ion secondary battery produced by forming an electrode mixture layer on an electrode collector using the electrode material for a lithium ion secondary battery of the present embodiment, the ratio of the mass energy density during 0.1 CA discharge at 0° C. to the mass energy density during 0.1 CA discharge at 25° C. is preferably 80% or more, and more preferably 85% or more.

When the ratio of the mass energy density during 0.1 CA discharge at 0° C. to the mass energy density during 0.1 CA discharge at 25° C. is 80% or more, for example, even in a case in which the lithium ion secondary battery is used in a cold district, it is possible to obtain a high mass energy density that is similar to that obtained in a case in which the lithium ion secondary battery is used in a warm district. In a case in which this lithium ion battery is used for an electric-powered vehicle such as an electric vehicle (EV), the electric-powered vehicle is still capable of travelling the same distance in a cold district as a case in which the electric-powered vehicle is driven in a warm district. On the other hand, when the ratio of the mass energy density during 0.1 CA discharge at 0° C. to the mass energy density during 0.1 CA discharge at 25° C. is less than 80%, for example, in a case in which the lithium ion secondary battery is used in a cold district, the mass energy density may significantly decrease compared with a case in which the lithium ion secondary battery is used in a warm district. In a case in which this lithium ion secondary battery is used for an electric-powered vehicle such as an EV, the electric-powered vehicle may be capable of travelling only a significantly shortened distance in a cold district.

In the electrode material for a lithium ion secondary battery of the present embodiment, the surfaces of the primary particles of the electrode active material are coated with a carbonaceous film, and the activation energy of an intercalation and deintercalation reaction of lithium ions ($Li^+$) occurring at the interface between the electrode active material and the carbonaceous film is preferably 55 kJ/mol or less, and more preferably 54 kJ/mol or less.

When the activation energy of an intercalation and deintercalation reaction of lithium ions is 55 kJ/mol or less, favorable low-temperature characteristics can be achieved without significantly impairing the intercalation and deintercalation reaction of lithium ions even at a low temperature such as 0° C. On the other hand, when the activation energy of an intercalation and deintercalation reaction of lithium ions exceeds 55 kJ/mol, the intercalation and deintercalation reaction of lithium ions may be significantly impaired at a low temperature such as 0° C., and favorable low-temperature characteristics may not be achieved.

Method for Manufacturing Electrode Material for Lithium Ion Secondary Battery

A method for manufacturing an electrode material for a lithium ion secondary battery of the present embodiment includes a step of synthesizing $LiFe_xMn_{1-x-y}M_yPO_4$ particles under pressurization by heating a raw material slurry A obtained by mixing a Li source, a P source, a Fe source, a Mn source, a Co source, and a Zn source as necessary with a solvent including water as a main component to a temperature in a range of 120° C. to 250° C. and a step of coating the surfaces of the $LiFe_xMn_{1-x-y}M_yPO_4$ particles (primary particles) with the carbonaceous film by drying a raw material slurry B obtained by dispersing the $LiFe_xMn_{1-x-y}M_yPO_4$ particles in a water solvent including a water-soluble thickener, granulating the raw material slurry B, and then heating the raw material slurry B to a temperature in a range of 550° C. to 820° C.

The crystal structure or the purity of $LiFe_xMn_{1-x-y}M_yPO_4$ particles is affected by the molar concentration of the Li source, the P source, the Fe source, the Mn source, the Co source, and the Zn source in the material slurry A or by the rate of temperature increase in the hydrothermal treatment.

When the concentration of the material slurry A is too low, high purity $LiFe_xMn_{1-x-y}M_yPO_4$ particles can be obtained. However, the crystal lattice constant is expanded and a crystal structure that is not suitable for Li diffusivity is formed. Thus, this case is not preferable. When the concentration of the material slurry A is too high, the crystal lattice constant is compressed and a crystal structure that is preferable for Li diffusivity can be obtained. However, impurities are easily formed and the purity of $LiFe_xMn_{1-x-y}M_yPO_4$ particles is deteriorated. Thus, this case is not preferable.

When the rate of temperature increase is too low, high purity $LiFe_xMn_{1-x-y}M_yPO_4$ particles can be obtained. However, the crystal lattice constant is expanded and a crystal structure that is not preferable for Li diffusivity is formed. Thus, this case is not preferable. The rate of temperature increase is preferably 1° C./min or more and more preferably 3° C./min or more.

In the above-described manufacturing method, first, the Li source, the P source, the Fe source, the Mn source, the Co source, and the Zn source as necessary are injected into the solvent including water as a main component, and are stirred together, thereby preparing the raw material slurry A including a precursor of $LiFe_xMn_{1-x-y}M_yPO_4$.

The Li source, the P source, the Fe source, the Mn source, the Co source, and the Zn source are injected into the solvent including water as a main component so that the molar ratio thereof (the Li source: the P source: the Fe source: the Mn source: the Co source: the Zn source), that is, the molar ratio of Li:P:Fe:Mn:Co:Zn reaches 1.8 to 3.5:0.9 to 1.3:0.05 to 0.35:0.49 to 0.945:0 to 0.14:0 to 0.14, and are stirred and mixed together, thereby preparing the raw material slurry A.

When the uniform mixing of the Li source, the P source, the Fe source, the Mn source, the Co source, and the Zn source is taken into account, it is preferable to temporarily form aqueous solutions of the Li source, the P source, the Fe source, the Mn source, the Co source, and the Zn source, respectively, and then mix the aqueous solutions.

The mol concentration of the Li source, the P source, the Fe source, the Mn source, the Co source, and the Zn source in the raw material slurry A is preferably in a range of 0.6 mol/L to 2.2 mol/L since it is necessary to obtain highly pure, highly crystalline, and extremely fine $LiFe_xMn_{1-x-y}M_yPO_4$ particles having a preferable crystal lattice constant.

Examples of the Li source include hydroxides such as lithium hydroxide (LiOH), lithium inorganic acid salts such as lithium carbonate ($Li_2CO_3$), lithium chloride (LiCl), lithium nitrate ($LiNO_3$), lithium phosphate ($Li_3PO_4$), lithium hydrogen phosphate ($Li_2HPO_4$), and lithium dihydrogen phosphate ($LiH_2PO_4$), lithium organic acid salts such as lithium acetate ($LiCH_3COO$), lithium oxalate (($COOLi)_2$), and hydrates thereof. At least one selected from the above-described group can be preferably used as the Li source.

Lithium phosphate ($Li_3PO_4$) can also be used as the Li source and the P source.

As the P source, for example, at least one selected from phosphoric acids such as ortho phosphoric acid ($H_3PO_4$) and meta phosphoric acid ($HPO_3$), phosphates such as ammonium dihydrogen phosphate ($NH_4H_2PO_4$), diammonium hydrogen phosphate (($NH_4)_2HPO_4$), ammonium phosphate (($NH_4)_3PO_4$), lithium phosphate ($Li_3PO_4$), lithium hydrogen phosphate ($Li_2HPO_4$), lithium dihydrogen phosphate ($LiH_2PO_4$), and hydrates thereof can be preferably used.

Examples of the Fe source that can be used include iron compounds such as iron (II) nitrate ($Fe(NO_3)_2$), iron (II) chloride ($FeCl_2$), iron (II) sulfate ($FeSO_4$), iron (II) acetate ($Fe(CH_3COO)_2$), and hydrates thereof, trivalent iron compounds such as iron (III) nitrate ($Fe(NO_3)_3$), iron (III) chloride ($FeCl_3$), and iron (III) citrate ($FeC_6H_5O_7$), lithium iron phosphates, and the like. As the Fe resource, at least one selected from the above-described group can be preferably used.

The Mn source is preferably a Mn salt and examples thereof include manganese (II) chloride ($MnCl_2$), manganese (II) sulfate ($MnSO_4$), manganese (II) nitrate ($Mn(NO_3)_2$), manganese (II) acetate ($Mn(CH_3COO)_2$), and hydrates thereof. As the Mn source, at least one selected from the above-described group can be preferably used.

The Co source is preferably a Co salt and examples thereof include, cobalt (II) chloride ($CoCl_2$), cobalt (II) sulfate ($CoSO_4$), cobalt (II) nitrate ($Co(NO_3)_2$), cobalt (II) acetate ($Co(CH_3COO)_2$), and hydrates thereof. As the Co source, at least one selected from the above-described group can be preferably used.

The Zn source is preferably a Zn salt and examples thereof include, zinc (II) chloride ($ZnCl_2$), zinc (II) sulfate ($ZnSO_4$), zinc (II) nitrate ($Zn(NO_3)_2$), zinc (II) acetate ($Zn(CH_3COO)_2$), and hydrates thereof. As the Zn source, at least one selected from the above-described group can be preferably used.

The solvent including water as a main component is either water alone or a water-based solvent including water as a main component and an aqueous solvent such as alcohol as necessary.

There is no particular limitation regarding the aqueous solvent as long as the solvent is capable of dissolving the Li source, the P source, the Fe source, the Mn source, the Co source, and the Zn source and examples thereof include alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetylacetone, and cyclohexanone, amides such as dimethyl formamide, N,N-dimethylacetoacetamide, and N-methyl pyrrolidone, glycols such as ethylene glycol, diethylene glycol, and propylene glycol, and the like. The aqueous solvent may be singly used, or a mixture of two or more aqueous solvents may be used. Some of the Li source, P source, the Fe source, the Mn source, the Co source, and the Zn source may be dissolved in the aqueous solvent.

Next, the raw material slurry A is put into a pressure resistant vessel, is heated to a temperature in a range of 120° C. to 250° C. and preferably in a range of 160° C. to 220° C., and is hydrothermally treated for 1 hour to 24 hours, thereby obtaining $LiFe_xMn_{1-x-y}M_yPO_4$ particles.

When the temperature of the raw material slurry A reaches the temperature in a range of 120° C. to 250° C., the pressure in the pressure resistant vessel reaches, for example, 0.3 MPa to 1.5 MPa.

In this case, it is possible to control the particle diameter of the $LiFe_xMn_{1-x-y}M_yPO_4$ particles to a desirable size by adjusting the temperature and the time during the hydrothermal treatment.

Next, the $LiFe_xMn_{1-x-y}M_yPO_4$ particles are dispersed in the water solvent including a water-soluble thickener, thereby preparing the raw material slurry B.

Water-soluble Thickener

There is no particular limitation regarding the water-soluble thickener and examples of the water-soluble thickener that can be used include natural water-soluble polymers such as gelatin, casein, collagen, hyaluronic acid, albumin, and starch, semisynthetic polymers such as methyl cellulose, ethyl cellulose, methyl hydroxypropyl cellulose, carboxymethyl cellulose, hydroxymethyl cellulose, hydroxypropyl cellulose, sodium carboxymethyl cellulose, and propylene glycol ester alginate, synthetic polymers such as polyvinyl alcohol, polyvinyl pyrrolidone, carbomer (carboxy vinyl polymer), polyacrylate, and polyethylene oxide, and the like.

These water-soluble thickeners may be singly used or a mixture of two or more water-soluble thickeners may be used.

In the method for manufacturing the electrode material for a lithium ion secondary battery of the present embodiment, the addition amount (additive rate) of the water-soluble thickener is preferably in a range of 1% by mass to 15% by mass and more preferably in a range of 2.5% by mass to 9.5% by mass when the total mass of the electrode active material and the water-soluble thickener is set to 100% by mass.

When the addition amount of the water-soluble thickener is less than 1% by mass, the mixing stability in the electrode material for a lithium ion secondary battery degrades, which is not preferable. On the other hand, when the addition amount of the water-soluble thickener exceeds 15% by mass, the content of the electrode active material decreases in relation to the content of the water-soluble thickener and the battery characteristics may degrade, which is not preferable.

Next, the raw material slurry B is dried, granulated, and then heated at a temperature in a range of 530° C. to 850° C. for 0.5 hours to 6 hours, and the surfaces of the $LiFe_xMn_{1-x-y}M_yPO_4$ particles (primary particles) are coated with a carbonaceous film, thereby obtaining an electrode material for a lithium ion secondary battery of the present embodiment.

Electrode for Lithium Ion Secondary Battery

An electrode for a lithium ion secondary battery of the present embodiment includes an electrode collector and an electrode mixture layer (electrode) formed on the electrode collector, in which the electrode mixture layer includes the electrode material for a lithium ion secondary battery of the present embodiment.

That is, the electrode for a lithium ion secondary battery of the present embodiment is produced by forming an electrode mixture layer on one main surface of an electrode collector using the electrode material for a lithium ion secondary battery of the present embodiment.

The electrode for a lithium ion secondary battery of the present embodiment is mainly used as a positive electrode for a lithium ion secondary battery.

Regarding the method for manufacturing the electrode for a lithium ion secondary battery of the present embodiment, there is no particular limitation as long as an electrode can be formed on one main surface of the electrode collector using the electrode material for a lithium ion secondary battery of the present embodiment. Examples of the method for manufacturing the electrode for a lithium ion secondary battery of the present embodiment include the following method.

First, paste for the electrode material for a lithium ion secondary battery is produced by mixing the electrode material for a lithium ion secondary battery of the present embodiment, a binding agent, a conductive auxiliary agent, and a solvent.

Binding Agent

Regarding the binding agent, there is no particular limitation as long as the binding agent can be used in a water system and, for example, at least one selected from the group consisting of polyethylene, polypropylene, polyethylene terephthalate, polymethyl methacrylate, vinyl acetate copolymers, styrene.butadiene-based latexes, acryl-based latexes, acrylonitrile.butadiene-based latexes, fluorine-based latexes, silicon-based latexes, and the like can be used.

The content rate of the binding agent in the paste for the electrode material for a lithium ion secondary battery is preferably in a range of 1% by mass to 15% by mass and more preferably in a range of 3% by mass to 9% by mass when the total mass of the electrode material for a lithium ion secondary battery of the present embodiment, the binding agent, and the conductive auxiliary agent is set to 100% by mass.

The reasons for setting the content rate of the binding agent in the above-described range are as described below. When the content rate of the binding agent is less than 1% by mass, in a case in which the electrode mixture layer is formed using the paste for the electrode material for a lithium ion secondary battery including the electrode material for a lithium ion secondary battery of the present embodiment, the binding properties between the electrode mixture layer and the collector are not sufficient and there are cases in which the electrode mixture layer cracks or drops during the rolling of the electrode mixture layer, which is not preferable. In addition, the electrode mixture layer is peeled off from the collector during the charge and discharge process of the battery and there are cases in which the battery capacity or the charge and discharge rate decreases, which is not preferable. On the other hand, when the content rate of the binding agent exceeds 15% by mass, the internal resistance of the electrode material for a lithium ion secondary battery increases and there are cases in which the battery capacity may decrease at a high-speed charge and discharge rate, which is not preferable.

Conductive Auxiliary Agent

There is no particular limitation regarding the conductive auxiliary agent and, for example, at least one selected from the group of fibrous carbon such as acetylene black, Ketjen black, furnace black, vapor grown carbon fiber (VGCF), and carbon nanotubes can be used.

The content rate of the conductive auxiliary agent in the paste for the electrode material for a lithium ion secondary battery is preferably in a range of 1% by mass to 15% by mass and more preferably in a range of 3% by mass to 10% by mass when the total mass of the electrode material for a lithium ion secondary battery of the present embodiment, the binding agent, and the conductive auxiliary agent is set to 100% by mass.

The reasons for setting the content rate of the conductive auxiliary agent in the above-described range are as described below. When the content rate of the conductive auxiliary agent is less than 1% by mass, in a case in which the positive electrode mixture layer (electrode mixture layer) is formed using the paste for the electrode material for a lithium ion secondary battery including the electrode material for a lithium ion secondary battery of the present embodiment, the electron conductivity may be insufficient and the battery capacity or the charge and discharge rate may decrease, which is not preferable. On the other hand, when the content of the conductive auxiliary agent exceeds 15% by mass, the content rate of the electrode material in the positive electrode mixture layer decreases in relation to the content of the other components and the battery capacity of the lithium ion battery per unit volume decreases, which is not preferable.

Solvent

In the paste for the electrode material for a lithium ion secondary battery including the electrode material for a lithium ion secondary battery of the present embodiment, a solvent may be appropriately added in order to facilitate the application of the paste to a substance to be coated such as the collector.

The main solvent is water, but the solvent may include a water-based solvent such as an alcohol, a glycol, or an ether as long as the characteristics of the electrode material for a lithium ion secondary battery of the present embodiment are not lost.

The content rate of the solvent in the paste for the electrode material for a lithium ion secondary battery is preferably in a range of 80% by mass to 300% by mass and more preferably in a range of 100% by mass to 250% by mass when the total mass of the electrode material for a lithium ion secondary battery of the present embodiment, the binding agent, and the conductive auxiliary agent is set to 100% by mass.

When the solvent is included in the above-described range, it is possible to obtain paste for the electrode material for a lithium ion secondary battery which is excellent in terms of electrode formability and battery characteristics.

Regarding the method for mixing the electrode material for a lithium ion secondary battery of the present embodiment, the binding agent, the conductive auxiliary agent, and the solvent, there is no particular limitation as long as the above-described components can be uniformly mixed together and examples thereof include methods in which a kneader such as a ball mill, a sand mill, a planetary mixer, a paint shaker, or a homogenizer is used.

Next, the paste for the electrode material for a lithium ion secondary battery is applied to one main surface of the electrode collector so as to produce a coated film, the coated film is dried, and then is bonded to the main surface through pressurization, whereby it is possible to obtain an electrode for a lithium ion secondary battery including the electrode mixture layer formed on one main surface of the electrode collector.

Lithium Ion Secondary Battery

A lithium ion secondary battery of the present embodiment includes the electrode (positive electrode) for a lithium ion secondary battery of the present embodiment, a negative electrode, a separator, and an electrolytic solution.

In the lithium ion secondary battery of the present embodiment, there is no particular limitation regarding the negative electrode, the electrolytic solution, the separator, and the like.

For example, for the negative electrode, it is possible to use a negative electrode material such as Li metal, a carbon material, a Li alloy, or $Li_4Ti_5O_{12}$.

In addition, a solid electrolyte may be used in place of the electrolytic solution and the separator.

The electrolytic solution can be produced by, for example, mixing ethylene carbonate (EC) and ethyl methyl carbonate (EMC) together so that the volume ratio reaches 1:1 and dissolving lithium hexafluorophosphate ($LiPF_6$) in the obtained solvent mixture so that a concentration of, for example, 1 mol/dm$^3$ is obtained.

As the separator, for example, porous propylene can be used.

In the lithium ion secondary battery of the present embodiment, since the electrode for a lithium ion secondary battery of the present embodiment is used as the positive electrode, the lithium ion secondary battery has a high capacity and a high energy density.

As described above, according to the electrode material for a lithium ion secondary battery of the present embodiment, since the electron conductivity and the ionic conductivity improve, it is possible to realize a lithium ion secondary battery having a high discharge capacity and a high mass energy density at a low temperature or at a high-speed charge and discharge.

According to the electrode for a lithium ion secondary battery of the present embodiment, since the electrode material for a lithium ion secondary battery of the present embodiment is included, it is possible to provide an electrode for a lithium ion secondary battery having a high discharge capacity and a high mass energy density at a low temperature or at a high-speed charge and discharge.

According to the lithium ion secondary battery of the present embodiment, since the electrode for a lithium ion secondary battery of the present embodiment is included, it is possible to provide a lithium ion secondary battery having a high discharge capacity and a high mass energy density at a low temperature or at a high-speed charge and discharge.

EXAMPLES

Hereinafter, the present invention will be specifically described using examples and comparative examples, but the present invention is not limited to the following examples.

Example 1

Synthesis of Electrode Material for a Lithium Ion Secondary Battery $LiFe_{0.22}Mn_{0.775}Co_{0.005}PO_4$ was synthesized as described below.

$Li_3PO_4$ was used as the Li source and the P source, a $Fe(NO_3)_2$ aqueous solution was used as the Fe source, a $Mn(NO_3)_2$ aqueous solution was used as the Mn source, a $Co(NO_3)_2$ aqueous solution was used as the Co source, and the respective sources were mixed together so that the molar ratio (Li:Fe:Mn:Co:P) reached 3:0.22:0.775:0.005:1, thereby preparing 600 ml of a raw material slurry A. The slurry was prepared to have a concentration such that the amount of $LiFe_{0.22}Mn_{0.775}Co_{0.005}PO_4$ when synthesized was 1.5 mol/L.

Next, the raw material slurry A was put into a pressure resistant vessel having a volume of 1.3 L.

After that, the raw material slurry A was heated by raising the temperature at a rate of temperature increase of 5° C./min and then holding the temperature at 175° C. for 8 hours, and was hydrothermally synthesized. The pressure in the pressure resistant vessel at this time was 0.9 MPa.

After the reaction, the atmosphere in the pressure resistant vessel was cooled to room temperature, thereby obtaining the sediment of a reaction product in a caked state.

This sediment was sufficiently washed with distilled water plural times and was held at a water content rate of 60% so as to remain undried, thereby producing a cake-like substance.

The cake-like substance was dried in a vacuum at 70° C. for 2 hours, the raw material slurry B obtained by dispersing 95% by mass of the obtained powder (particles) and 7% by mass of polyvinyl alcohol that had been adjusted to 10% by mass in advance in the water solvent was dried and granulated, and then a thermal treatment was carried out at 750° C. for 4 hours so as to coat the surfaces of the particles with a carbonaceous film, thereby obtaining an electrode material for a lithium ion secondary battery of Example 1.

Production of Lithium Ion Secondary Battery

The electrode material for a lithium ion secondary battery, polyvinylidene fluoride (PVdF) as the binding agent, and acetylene black (AB) as a conductive auxiliary agent were added to N-methyl-2-pyrrolidinone (NMP) which was a solvent so that the mass ratio in the paste reached 90:5:5 (electrode material:AB:PVdF), and the components were mixed together, thereby preparing paste for an electrode material for a lithium ion secondary battery.

Next, the paste for the electrode material for a lithium ion secondary battery was applied to the surface of a 30 μm-thick aluminum foil (collector) so as to form a coated film, and the coated film was dried, thereby forming an electrode mixture layer on the surface of the aluminum foil. After that, the electrode mixture layer was pressurized at a predetermined pressure so that a predetermined density was obtained, thereby producing a positive electrode for a lithium ion secondary battery of Example 1.

Next, the positive electrode for a lithium ion secondary battery was punched using a punch so as to produce a disc-shape piece having a diameter of 16 mm, the piece was dried in a vacuum, and then a lithium ion secondary battery of Example 1 was produced using a stainless steel (SUS) 2016 coin cell in a dry argon atmosphere.

Lithium metal was used as the negative electrode, a porous polypropylene film was used as the separator, and a 1 M $LiPF_6$ solution was used as the electrolytic solution. As the $LiPF_6$ solution, a solution obtained by mixing ethylene carbonate and ethyl methyl carbonate at a volume ratio of 1:1 was used.

Assessment of Sediment of Reaction Product (1) X-ray diffraction

A slight amount of a specimen was taken from the sediment of the reaction product in a caked state, and the specimen was dried in a vacuum at 70° C. for 2 hours, thereby obtaining powder.

As a result of identifying the powder using an X-ray diffraction apparatus (trade name: X'Pert PRO MPS, manufactured by PANalytical B. V., ray source: CuKα), it was confirmed that single-phase $LiFe_{0.20}Mn_{0.79}Co_{0.01}PO_4$ was generated. In addition, the crystal lattice constant and lattice volume were computed from the X-ray diffraction patterns of the powder. The assessment results are described in Table 2.

Assessment of Electrode Material for Lithium Ion Secondary Battery (1) Amount of Carbon The amount of carbon in the electrode material for a lithium ion secondary battery was measured using a carbon analyzer (trade name: EMIA-220V, manufactured by Horiba, Ltd.). The assessment results are described in Table 1.

(2) Specific Surface Area

The specific surface area of the electrode material for a lithium ion secondary battery was measured using a specific surface area meter (trade name: BELSORP-mini, manufactured by BEL Japan, Inc.) and a BET method in which nitrogen ($N_2$) adsorption was used. The assessment results are described in Table 1.

(3) Average Primary Particle Diameter

The electrode material for a lithium ion secondary battery was observed using a scanning electron microscope (SEM) (trade name: S-4800, manufactured by Hitachi High-Technologies Corporation) and the average primary particle diameter of the electrode material for a lithium ion secondary battery was obtained from the obtained scanning electron microscopic image. The assessment results are described in Table 1.

Assessment of Lithium Ion Secondary Battery (1) Activation Energy of Intercalation and Deintercalation Reaction of Lithium Ions The impedance of the lithium ion secondary battery was measured using an impedance analyzer (trade name: VersaSTAT4, manufactured by Princeton Applied Research).

In the measurement of the impedance, the frequency was set in a range of 1 MHz to 0.1 mHz and a semicircular arc appearing at a frequency of 100 Hz or less was used as the resistance of the intercalation and deintercalation reaction of lithium ions occurring at the interface between the electrode active material and the carbonaceous film. The impedance was measured at 30° C., 35° C., 40° C., 45° C., 50° C., and 55° C., the temperature dependency of the resistance of the intercalation and deintercalation reaction of lithium ions occurring at the interface between the electrode active material and the carbonaceous film was obtained, and the activation energy of the intercalation and deintercalation reaction of lithium ions was computed from the slope of the Arrhenius Plot.

It can be said that an electrode active material in which the intercalation and deintercalation reaction of lithium ions easily occurs has high performance. In the present examples, the index at which the activation energy is 55 kJ/mol or less was determined to be favorable. The assessment results are described in Table 2.

(2) Battery Characteristics

The battery characteristics of the lithium ion secondary battery were assessed. At an environmental temperature of 25° C., the battery was constant-current-charged at a current value of 0.1 CA until the voltage of the positive electrode reached 4.3 V with respect to the equilibrium voltage of Li. After the voltage reached 4.3 V, the battery was constant-voltage-charged until the current value reached 0.01 CA. After that, the battery was left to stand for 1 minute, at an environmental temperature of 25° C. or 0° C., the battery was constant-current-discharged at 0.1 CA until the voltage of the positive electrode reached 2.0 V with respect to the equilibrium voltage of Li. The discharge capacity and mass energy density (unit: Wh/kg) of the lithium ion secondary battery were assessed through the above-described test. The mass energy density is expressed by the integration value of the discharge capacity and the discharge voltage, and is a value corresponding to an area when the discharge voltage and the discharge capacity are respectively plotted along the vertical axis and the horizontal axis. In a case in which the mass energy density is measured at 0° C., compared with a case in which the mass energy density is measured at 25° C., the discharge capacity and the discharge voltage decrease and the mass energy density decreases. Here, for example, a significant decrease in the discharge voltage significantly decreases the mass energy density even in a case in which the discharge capacity decreases only slightly. When an electrode material having excellent electron conductivity, Li diffusivity, and activation energy of the intercalation and deintercalation reaction of lithium ions ($Li^+$) as obtained in the present example is used, it is possible to suppress a decrease in both the discharge capacity and the discharge voltage even during 0° C. discharge, and it becomes possible to suppress a decrease in the mass energy density.

In the present examples, in order to obtain an electrode active material capable of exhibiting high performance under a low temperature environment, the index at which the 0.1 CA discharge capacity measured at 0° C. is 120 mAh/g or more was determined to be favorable.

In the present examples, in addition to the above index, in order to obtain an electrode active material capable of exhibiting the same performance as at room temperature even under a low temperature environment, the index at which the ratio of the 0.1 CA discharge capacity measured at 0° C. to the 0.1 CA discharge capacity measured at 25° C. is 80% or more was determined to be favorable.

Further, in the present examples, in order to obtain an electrode active material capable of exhibiting high performance under a low temperature environment, the index at which the mass energy density during 0.1 CA discharge at 0° C. is 450 Wh/g or more was determined to be favorable.

In the present examples, in addition to the above index, in order to obtain an electrode active material capable of exhibiting the same performance as at room temperature even under a low temperature environment, the index at which the ratio of the mass energy density during 0.1 CA discharge at 0° C. to the mass energy density during 0.1 CA discharge at 25° C. is 80% or more was determined to be favorable.

The assessment results are described in Table 3.

Example 2

An electrode material for a lithium ion secondary battery of Example 2 was synthesized in the same manner as in Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, a $Co(NO_3)_2$ aqueous solution was used as the Co source, and the respective sources were mixed together so that the molar ratio (Li:Fe:Mn:Co:P) reached 3:0.22:0.77:0.01:1, thereby preparing the raw material slurry A.

In addition, a lithium ion secondary battery of Example 2 was produced in the same manner as in Example 1 except for the fact that the electrode material for a lithium ion secondary battery of Example 2 was used.

Example 3

An electrode material for a lithium ion secondary battery of Example 3 was synthesized in the same manner as in Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, a $Co(NO_3)_2$ aqueous solution was used as the Co source, and the respective sources were mixed together so that the molar ratio (Li:Fe:Mn:Co:P) reached 3:0.22:0.765:0.015:1, thereby preparing the raw material slurry A.

In addition, a lithium ion secondary battery of Example 3 was produced in the same manner as in Example 1 except for the fact that the electrode material for a lithium ion secondary battery of Example 3 was used.

Example 4

An electrode material for a lithium ion secondary battery of Example 4 was synthesized in the same manner as in Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, a $Co(NO_3)_2$ aqueous solution was used as the Co source, and the respective sources were mixed together so that the molar ratio (Li:Fe:Mn:Co:P) reached 3:0.25:0.745:0.005:1, thereby preparing the raw material slurry A.

In addition, a lithium ion secondary battery of Example 4 was produced in the same manner as in Example 1 except for the fact that the electrode material for a lithium ion secondary battery of Example 4 was used.

Example 5

An electrode material for a lithium ion secondary battery of Example 5 was synthesized in the same manner as in Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, a $Co(NO_3)_2$ aqueous solution was used as the Co source, and the respective sources were mixed together so that the molar ratio (Li:Fe:Mn:Co:P) reached 3:0.25:0.74:0.01:1, thereby preparing the raw material slurry A.

In addition, a lithium ion secondary battery of Example 5 was produced in the same manner as in Example 1 except for the fact that the electrode material for a lithium ion secondary battery of Example 5 was used.

Example 6

An electrode material for a lithium ion secondary battery of Example 6 was synthesized in the same manner as in Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, a $Co(NO_3)_2$ aqueous solution was used as the Co source, and the respective sources were mixed together so that the molar ratio (Li:Fe:Mn:Co:P) reached 3:0.25:0.735:0.015:1, thereby preparing the raw material slurry A.

In addition, a lithium ion secondary battery of Example 6 was produced in the same manner as in Example 1 except for the fact that the electrode material for a lithium ion secondary battery of Example 6 was used.

Example 7

An electrode material for a lithium ion secondary battery of Example 7 was synthesized in the same manner as in Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, a $Co(NO_3)_2$ aqueous solution was used as the Co source, and the respective sources were mixed together so that the molar ratio (Li:Fe:Mn:Co:P) reached 3:0.30:0.695:0.005:1, thereby preparing the raw material slurry A.

In addition, a lithium ion secondary battery of Example 7 was produced in the same manner as in Example 1 except for the fact that the electrode material for a lithium ion secondary battery of Example 7 was used.

Example 8

An electrode material for a lithium ion secondary battery of Example 8 was synthesized in the same manner as in Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, and a $Co(NO_3)_2$ aqueous solution was used as the Co source, and the respective sources were mixed together so that the molar ratio (Li:Fe:Mn:Co:P) reached 3:0.30:0.69:0.01:1, thereby preparing the raw material slurry A.

In addition, a lithium ion secondary battery of Example 8 was produced in the same manner as in Example 1 except for the fact that the electrode material for a lithium ion secondary battery of Example 8 was used.

Example 9

An electrode material for a lithium ion secondary battery of Example 9 was synthesized in the same manner as in Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, and a $Co(NO_3)_2$ aqueous solution was used as the Co source, and the respective sources were mixed together so that the molar ratio (Li:Fe:Mn:Co:P) reached 3:0.30:0.685:0.015:1, thereby preparing the raw material slurry A.

In addition, a lithium ion secondary battery of Example 9 was produced in the same manner as in Example 1 except for the fact that the electrode material for a lithium ion secondary battery of Example 9 was used.

Example 10

An electrode material for a lithium ion secondary battery of Example 10 was synthesized in the same manner as in Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, and a $Co(NO_3)_2$ aqueous solution was used as the Co source, and the respective sources were mixed together so that the molar ratio (Li:Fe:Mn:Co:P) reached 3:0.35:0.645:0.005:1, thereby preparing the raw material slurry A.

In addition, a lithium ion secondary battery of Example 10 was produced in the same manner as in Example 1 except for the fact that the electrode material for a lithium ion secondary battery of Example 10 was used.

Example 11

An electrode material for a lithium ion secondary battery of Example 11 was synthesized in the same manner as in Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, and a $Co(NO_3)_2$ aqueous solution was used as the Co source, and the respective sources were mixed together so that the molar ratio (Li:Fe:Mn:Co:P) reached 3:0.35:0.64:0.01:1, thereby preparing the raw material slurry A.

In addition, a lithium ion secondary battery of Example 11 was produced in the same manner as in Example 1 except for the fact that the electrode material for a lithium ion secondary battery of Example 11 was used.

Example 12

An electrode material for a lithium ion secondary battery of Example 12 was synthesized in the same manner as in Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, and a $Co(NO_3)_2$ aqueous solution was used as the Co source, and the respective sources were mixed together so that the molar ratio (Li:Fe:Mn:Co:P) reached 3:0.35:0.635:0.015:1, thereby preparing the raw material slurry A.

In addition, a lithium ion secondary battery of Example 12 was produced in the same manner as in Example 1 except for the fact that the electrode material for a lithium ion secondary battery of Example 12 was used.

Example 13

$LiFe_{0.25}Mn_{0.745}Co_{0.010}Zn_{0.005}PO_4$ was synthesized as described below.

$Li_3PO_4$ was used as the Li source and the P source, a $Fe(NO_3)_2$ aqueous solution was used as the Fe source, a $Mn(NO_3)_2$ aqueous solution was used as the Mn source, a $Co(NO_3)_2$ aqueous solution was used as the Co source, and a $Zn(NO_3)_2$ aqueous solution was used as the Zn source, and the respective sources were mixed together so that the molar ratio (Li:Fe:Mn:Co:Zn:P) reached 3:0.25:0.745:0.010:0.005:1, thereby preparing 200 ml of the raw material slurry A.

Next, an electrode material for a lithium ion secondary battery of Example 13 was obtained in the same manner as in Example 1.

In addition, a lithium ion secondary battery of Example 13 was produced in the same manner as in Example 1 except for the fact that the electrode material for a lithium ion secondary battery of Example 13 was used.

Comparative Example 1

$LiFe_{0.250}Mn_{0.750}PO_4$ was synthesized as described below.

$Li_3PO_4$ was used as the Li source and the P source, a $Fe(NO_3)_2$ aqueous solution was used as the Fe source, a $Mn(NO_3)_2$ aqueous solution was used as the Mn source, and the respective sources were mixed together so that the molar ratio (Li:Fe:Mn:P) reached 3:0.25:0.75:1, thereby preparing 200 ml of the raw material slurry A.

Next, an electrode material for a lithium ion secondary battery of Comparative Example 1 was obtained in the same manner as in Example 1.

In addition, a lithium ion secondary battery of Comparative Example 1 was produced in the same manner as in Example 1 except for the fact that the electrode material for a lithium ion secondary battery of Comparative Example 1 was used.

Comparative Example 2

An electrode material for a lithium ion secondary battery of Comparative Example 2 was synthesized in the same manner as in Comparative Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, a $Co(NO_3)_2$ aqueous solution was used as the Co source, and the respective sources were mixed together so that the molar ratio (Li:Fe:Mn:Co:P) reached 3:0.40:0.59:0.01:1, thereby preparing the raw material slurry A.

In addition, a lithium ion secondary battery of Comparative Example 2 was produced in the same manner as in Example 1 except for the fact that the electrode material for a lithium ion secondary battery of Comparative Example 2 was used.

Comparative Example 3

An electrode material for a lithium ion secondary battery of Comparative Example 3 was synthesized in the same manner as in Comparative Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, a $Co(NO_3)_2$ aqueous solution was used as the Co source, and the respective sources were mixed together so that the molar ratio (Li:Fe:Mn:Co:P) reached 3:0.18:0.81:0.01:1, thereby preparing the raw material slurry A.

In addition, a lithium ion secondary battery of Comparative Example 3 was produced in the same manner as in Example 1 except for the fact that the electrode material for a lithium ion secondary battery of Comparative Example 3 was used.

Comparative Example 4

An electrode material for a lithium ion secondary battery of Comparative Example 4 was synthesized in the same manner as in Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, a $Co(NO_3)_2$ aqueous solution was used as the Co source, and the respective sources were mixed together so that the molar ratio (Li:Fe:Mn:Co:P) reached 3:0.25:0.73:0.02:1, thereby preparing the raw material slurry A.

In addition, a lithium ion secondary battery of Comparative Example 4 was produced in the same manner as in Example 1 except for the fact that the electrode material for a lithium ion secondary battery of Comparative Example 4 was used.

Comparative Example 5

An electrode material for a lithium ion secondary battery of Comparative Example 5 was synthesized in the same manner as in Comparative Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, a $Co(NO_3)_2$ aqueous solution was used as the Co source, and the respective sources were mixed together so that the molar ratio (Li:Fe:Mn:Coi:P) reached 3:0.25:0.748:0.002:1, thereby preparing the raw material slurry A.

In addition, a lithium ion secondary battery of Comparative Example 5 was produced in the same manner as in Example 1 except for the fact that the electrode material for a lithium ion secondary battery of Comparative Example 5 was used.

Comparative Example 6

$LiFe_{0.25}Mn_{0.745}Ni_{0.005}PO_4$ was synthesized as described below.

$Li_3PO_4$ was used as the Li source and the P source, a $Fe(NO_3)_2$ aqueous solution was used as the Fe source, a $Mn(NO_3)_2$ aqueous solution was used as the Mn source, a $Ni(NO_3)_2$ aqueous solution was used as the Ni source, and the respective sources were mixed together so that the molar ratio (Li:Fe:Mn:Ni:P) reached 3:0.25:0.745:0.005:1, thereby preparing 200 ml of the raw material slurry A.

An electrode material for a lithium ion secondary battery of Comparative Example 6 was obtained in the same manner as in Example 1.

In addition, a lithium ion secondary battery of Comparative Example 6 was produced in the same manner as in Example 1 except for the fact that the electrode material for a lithium ion secondary battery of Comparative Example 6 was used.

Comparative Example 7

An electrode material for a lithium ion secondary battery of Comparative Example 7 was synthesized in the same manner as in Comparative Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, a $Ni(NO_3)_2$ aqueous solution was used as the Ni source, and the respective sources were mixed together so that the molar ratio (Li:Fe:Mn:Ni:P) reached 3:0.25:0.745:0.005:1, thereby preparing the raw material slurry A.

In addition, a lithium ion secondary battery of Comparative Example 7 was produced in the same manner as in Example 1 except for the fact that the electrode material for a lithium ion secondary battery of Comparative Example 7 was used.

Comparative Example 8

An electrode material for a lithium ion secondary battery of Comparative Example 8 was synthesized in the same manner as in Comparative Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, a $Ni(NO_3)_2$ aqueous solution was used as the Ni source, and the respective sources were mixed together so that the molar ratio (Li:Fe:Mn:Ni:P) reached 3:0.25:0.735:0.015:1, thereby preparing the raw material slurry A.

In addition, a lithium ion secondary battery of Comparative Example 8 was produced in the same manner as in Example 1 except for the fact that the electrode material for a lithium ion secondary battery of Comparative Example 8 was used.

Comparative Example 9

$LiFe_{0.25}Mn_{0.745}Al_{0.005}PO_4$ was synthesized as described below.

$Li_3PO_4$ was used as the Li source and the P source, a $Fe(NO_3)_2$ aqueous solution was used as the Fe source, a $Mn(NO_3)_2$ aqueous solution was used as the Mn source, an $Al(NO_3)_3$ aqueous solution was used as the Al source, and the respective sources were mixed together so that the molar ratio (Li:Fe:Mn:Al:P) reached 3:0.25:0.745:0.005:1, thereby preparing 200 ml of the raw material slurry A.

Next, an electrode material for a lithium ion secondary battery of Comparative Example 9 was obtained in the same manner as in Example 1.

In addition, a lithium ion secondary battery of Comparative Example 9 was produced in the same manner as in Example 1 except for the fact that the electrode material for a lithium ion secondary battery of Comparative Example 9 was used.

Comparative Example 10

An electrode material for a lithium ion secondary battery of Comparative Example 10 was synthesized in the same manner as in Comparative Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, an $Al(NO_3)_3$ aqueous solution was used as the Al source, and the respective sources were mixed together so that the molar ratio (Li:Fe:Mn:Al:P) reached 3:0.25:0.74:0.01:1, thereby preparing the raw material slurry A.

In addition, a lithium ion secondary battery of Comparative Example 10 was produced in the same manner as in Example 1 except for the fact that the electrode material for a lithium ion secondary battery of Comparative Example 10 was used.

Comparative Example 11

An electrode material for a lithium ion secondary battery of Comparative Example 11 was synthesized in the same manner as in Comparative Example 1 except for the fact that $Li_3PO_4$ was used as the Li source and the P source, a $Fe(NO_3)_2$ aqueous solution was used as the Fe source, a $Mn(NO_3)_2$ aqueous solution was used as the Mn source, an $Al(NO_3)_3$ aqueous solution was used as the Al source, and the respective sources were mixed together so that the molar ratio (Li:Fe:Mn:Al:P) reached 3:0.25:0.735:0.015:1, thereby preparing the raw material slurry A.

In addition, a lithium ion secondary battery of Comparative Example 11 was produced in the same manner as in Example 1 except for the fact that the electrode material for a lithium ion secondary battery of Comparative Example 11 was used.

Assessment of Sediment of Reaction Product (1) X-ray Diffraction

The sediments of the reaction products of Examples 2 to 13 and Comparative Examples 1 to 11 were identified in the same manner as in Example 1. As a result, it was confirmed that:

single-phase $LiFe_{0.22}Mn_{0.77}Co_{0.01}PO_4$ was generated in Example 2, single-phase $LiFe_{0.22}Mn_{0.765}Co_{0.015}PO_4$ was generated in Example 3, single-phase $LiFe_{0.25}Mn_{0.745}Co_{0.005}PO_4$ was generated in Example 4, single-phase $LiFe_{0.25}Mn_{0.74}CO_{0.01}PO_4$ was generated in Example 5, single-phase $LiFe_{0.25}Mn_{0.735}Co_{0.015}PO_4$ was generated in Example 6, single-phase $LiFe_{0.30}Mn_{0.695}Co_{0.005}PO_4$ was generated in Example 7, single-phase $LiFe_{0.30}Mn_{0.69}CO_{0.01}PO_4$ was generated in Example 8, single-phase $LiFe_{0.30}Mn_{0.685}Co_{0.015}PO_4$ was generated in Example 9, single-phase $LiFe_{0.30}Mn_{0.645}Co_{0.005}PO_4$ was generated in Example 10, single-phase $LiFe_{0.35}Mn_{0.64}CO_{0.01}PO_4$ was generated in Example 11, single-phase $LiFe_{0.35}Mn_{0.635}Co_{0.015}PO_4$ was generated in Example 12, and single-phase $LiFe_{0.25}Mn_{0.735}CO_{0.010}Zn_{0.005}PO_4$ was generated in Example 13.

In addition, it was confirmed that:

$LiFe_{0.25}Mn_{0.75}PO_4$ was generated in Comparative Example 1, $LiFe_{0.40}Mn_{0.59}CO_{0.01}PO_4$ was generated in Comparative Example 2, $LiFe_{0.18}Mn_{0.81}Co_{0.01}PO_4$ was generated in Comparative Example 3, $LiFe_{0.25}Mn_{0.73}Co_{0.02}PO_4$ was generated in Comparative Example 4, $LiFe_{0.25}Mn_{0.748}Co_{0.002}PO_4$ was generated in Comparative Example 5, $LiFe_{0.25}Mn_{0.745}Ni_{0.005}PO_4$ was generated in Comparative Example 6, $LiFe_{0.25}Mn_{0.74}Ni_{0.01}PO_4$ was generated in Comparative Example 7, $LiFe_{0.25}Mn_{0.735}Ni_{0.015}PO_4$ was generated in Comparative Example 8, $LiFe_{0.25}Mn_{0.745}Al_{0.005}PO_4$ was generated in Comparative Example 9, $LiFe_{0.25}Mn_{0.74}Al_{0.01}PO_4$ was generated in Comparative Example 10, and $LiFe_{0.25}Mn_{0.735}Al_{0.015}PO_4$ was generated in Comparative Example 11.

In addition, the crystal lattice constants were computed from the X-ray diffraction patterns of the sediments of the reaction products of Examples 2 to 13 and Comparative Examples 1 to 11. The assessment results are described in Table 2.

(2) Lattice Volume

The lattice volumes of the sediments of the reaction products of Examples 2 to 13 and Comparative Examples 1 to 11 were computed in the same manner as in Example 1. The assessment results are described in Table 2.

Assessment of Electrode Material for Lithium Ion Secondary Battery (1) Supporting Amount of Carbon The supporting amounts of carbon in the electrode materials for a lithium ion secondary battery of Examples 2 to 13 and Comparative Examples 1 to 11 were measured in the same manner as in Example 1. The assessment results are described in Table 1.

(2) Specific Surface Area

The specific surface areas of the electrode materials for a lithium ion secondary battery of Examples 2 to 13 and Comparative Examples 1 to 11 were measured in the same manner as in Example 1. The assessment results are described in Table 1.

(3) Average Primary Particle Diameter

The average primary particle diameters of the electrode materials for a lithium ion secondary battery of Examples 2 to 13 and Comparative Examples 1 to 11 were obtained in the same manner as in Example 1. The assessment results are described in Table 1.

Assessment of Lithium Ion Secondary Battery (1) Activation Energy of Intercalation and Deintercalation Reaction of Lithium Ions The impedance of each of the lithium ion secondary batteries of Examples 2 to 13 and Comparative Examples 1 to 11 was measured in the same manner as in Example 1 and the activation energies of the intercalation and deintercalation reaction of lithium ions were computed. The assessment results are described in Table 1.

(2) Battery Characteristics

The battery characteristics of the lithium ion secondary batteries of Examples 2 to 13 and Comparative Examples 1 to 11 were assessed in the same manner as in Example 1. The assessment results are described in Table 3.

TABLE 2

| | Crystal lattice constant [Å] | | | Lattice volume [Å$^3$] | Activation energy of intercalation and deintercalation reaction of lithium ions [kJ/mol] |
|---|---|---|---|---|---|
| | a | b | c | | |
| Example 1 | 10.4106 | 6.0321 | 4.7218 | 296.52 | 53.21 |
| Example 2 | 10.3721 | 6.0547 | 4.7258 | 296.78 | 53.15 |
| Example 3 | 10.3541 | 6.0500 | 4.7248 | 295.97 | 53.41 |
| Example 4 | 10.3802 | 6.0549 | 4.7243 | 296.93 | 52.18 |
| Example 5 | 10.3652 | 6.0514 | 4.7234 | 296.27 | 52.29 |
| Example 6 | 10.3502 | 6.0471 | 4.7224 | 295.57 | 51.89 |
| Example 7 | 10.3699 | 6.0499 | 4.7126 | 295.65 | 51.96 |
| Example 8 | 10.3550 | 6.0460 | 4.7116 | 294.97 | 52.73 |
| Example 9 | 10.3400 | 6.0420 | 4.7106 | 294.29 | 52.13 |
| Example 10 | 10.3599 | 6.0477 | 4.7165 | 295.36 | 52.87 |
| Example 11 | 10.3440 | 6.0409 | 4.7155 | 294.66 | 52.65 |
| Example 12 | 10.3292 | 6.0368 | 4.7145 | 293.98 | 53.14 |
| Example 13 | 10.3602 | 6.0489 | 4.7231 | 295.98 | 53.98 |
| Comparative Example 1 | 10.4003 | 6.0622 | 4.7277 | 298.08 | 58.43 |
| Comparative Example 2 | 10.3638 | 6.0436 | 4.7136 | 295.23 | 54.21 |
| Comparative Example 3 | 10.4085 | 6.0664 | 4.7309 | 298.72 | 56.44 |
| Comparative Example 4 | 10.3376 | 6.0469 | 4.7235 | 295.27 | 53.11 |
| Comparative Example 5 | 10.3947 | 6.0607 | 4.7274 | 297.82 | 57.34 |
| Comparative Example 6 | 10.3992 | 6.0617 | 4.7275 | 298.01 | 61.66 |
| Comparative Example 7 | 10.3982 | 6.0613 | 4.7274 | 297.95 | 61.40 |
| Comparative Example 8 | 10.3970 | 6.0606 | 4.7271 | 297.87 | 60.84 |
| Comparative Example 9 | 10.3989 | 6.0617 | 4.7274 | 297.99 | 64.73 |

TABLE 1

| | Fe | Mn | Co | Zn | Ni | Al | Specific surface area [m$^2$/g] | Supporting amount of carbon [% by mass] | Average primary particle diameter [nm] |
|---|---|---|---|---|---|---|---|---|---|
| | \multicolumn{6}{c}{Ratio among elements contained [molar ratio]} | | | |
| Example 1 | 22 | 77.5 | 0.5 | 0 | 0 | 0 | 11.5 | 0.98 | 198 |
| Example 2 | 22 | 77.0 | 1 | 0 | 0 | 0 | 11.3 | 1.03 | 218 |
| Example 3 | 22 | 76.5 | 1.5 | 0 | 0 | 0 | 10.9 | 0.96 | 241 |
| Example 4 | 25 | 74.5 | 0.5 | 0 | 0 | 0 | 11.4 | 1.01 | 203 |
| Example 5 | 25 | 74.0 | 1 | 0 | 0 | 0 | 11.3 | 1.04 | 211 |
| Example 6 | 25 | 73.5 | 1.5 | 0 | 0 | 0 | 11.0 | 0.99 | 237 |
| Example 7 | 30 | 69.5 | 0.5 | 0 | 0 | 0 | 10.9 | 1.08 | 250 |
| Example 8 | 30 | 69.0 | 1 | 0 | 0 | 0 | 10.6 | 1.05 | 271 |
| Example 9 | 30 | 68.5 | 1.5 | 0 | 0 | 0 | 10.4 | 1.06 | 297 |
| Example 10 | 35 | 64.5 | 0.5 | 0 | 0 | 0 | 11.1 | 1.15 | 223 |
| Example 11 | 35 | 64.0 | 1 | 0 | 0 | 0 | 10.4 | 1.12 | 308 |
| Example 12 | 35 | 63.5 | 1.5 | 0 | 0 | 0 | 10.2 | 1.04 | 327 |
| Example 13 | 25 | 73.5 | 1 | 0.5 | 0 | 0 | 12.1 | 1.27 | 164 |
| Comparative Example 1 | 25 | 75.0 | 0 | 0 | 0 | 0 | 11.9 | 1.11 | 172 |
| Comparative Example 2 | 40 | 59.0 | 1 | 0 | 0 | 0 | 8.9 | 0.94 | 401 |
| Comparative Example 3 | 18 | 81.0 | 1 | 0 | 0 | 0 | 13.1 | 0.99 | 134 |
| Comparative Example 4 | 25 | 73.0 | 2 | 0 | 0 | 0 | 7.7 | 1.03 | 431 |
| Comparative Example 5 | 25 | 74.8 | 0.2 | 0 | 0 | 0 | 12.8 | 1.07 | 146 |
| Comparative Example 6 | 25 | 74.5 | 0 | 0 | 0.5 | 0 | 11.9 | 1.04 | 177 |
| Comparative Example 7 | 25 | 74.0 | 0 | 0 | 1 | 0 | 12.8 | 1.18 | 151 |
| Comparative Example 8 | 25 | 73.5 | 0 | 0 | 1.5 | 0 | 13.6 | 1.20 | 132 |
| Comparative Example 9 | 25 | 74.5 | 0 | 0 | 0 | 0.5 | 13.1 | 1.16 | 147 |
| Comparative Example 10 | 25 | 74.0 | 0 | 0 | 0 | 1 | 13.4 | 1.23 | 145 |
| Comparative Example 11 | 25 | 73.5 | 0 | 0 | 0 | 1.5 | 13.9 | 1.25 | 137 |

TABLE 2-continued

| | Crystal lattice constant [Å] | | | Lattice volume [Å³] | Activation energy of intercalation and deintercalation reaction of lithium ions [kJ/mol] |
|---|---|---|---|---|---|
| | a | b | c | | |
| Comparative Example 10 | 10.3733 | 6.0613 | 4.7270 | 297.21 | 65.61 |
| Comparative Example 11 | 10.3960 | 6.0608 | 4.7267 | 297.82 | 64.11 |

TABLE 3

| | Charge and discharge capacity [mAh/g] | | 0° C./25° C. ratio [%] | Energy density [Wh/kg] | | 0° C./25° C. ratio [%] |
|---|---|---|---|---|---|---|
| | 25° C. | 0° C. | | 25° C. | 0° C. | |
| Example 1 | 147.2 | 123.1 | 83.6 | 568.1 | 461.2 | 81.2 |
| Example 2 | 145.2 | 123.4 | 85.0 | 561.3 | 461.8 | 82.3 |
| Example 3 | 143.9 | 121.1 | 83.3 | 556.2 | 450.9 | 81.1 |
| Example 4 | 149.1 | 129.3 | 86.7 | 575.2 | 484.3 | 84.2 |
| Example 5 | 147.5 | 127.4 | 86.4 | 569.2 | 473.2 | 83.1 |
| Example 6 | 145.3 | 124.4 | 85.6 | 562.8 | 465.2 | 82.7 |
| Example 7 | 151.2 | 136.3 | 90.1 | 582.8 | 493.1 | 84.6 |
| Example 8 | 150.5 | 134.1 | 89.1 | 578.3 | 484.2 | 83.7 |
| Example 9 | 148.9 | 132.1 | 88.7 | 569.4 | 472.1 | 82.9 |
| Example 10 | 152.9 | 137.2 | 89.7 | 571.4 | 479.4 | 83.9 |
| Example 11 | 151.4 | 136.2 | 90.0 | 568.3 | 469.9 | 82.7 |
| Example 12 | 150.1 | 134.3 | 89.5 | 564.2 | 465.2 | 82.5 |
| Example 13 | 147.4 | 126.2 | 85.6 | 568.2 | 468.5 | 82.5 |
| Comparative Example 1 | 146.3 | 115.3 | 78.8 | 557.4 | 434.0 | 77.9 |
| Comparative Example 2 | 151.1 | 137.1 | 90.7 | 539.2 | 441.4 | 81.9 |
| Comparative Example 3 | 139.6 | 111.5 | 79.9 | 531.5 | 430.3 | 81.0 |
| Comparative Example 4 | 142.1 | 115.2 | 81.1 | 544.4 | 441.8 | 81.2 |
| Comparative Example 5 | 145.3 | 115.6 | 79.6 | 546.3 | 439.7 | 80.5 |
| Comparative Example 6 | 145.7 | 114.9 | 78.9 | 554.8 | 438.2 | 79.0 |
| Comparative Example 7 | 140.9 | 109.5 | 77.7 | 535.1 | 421.7 | 78.8 |
| Comparative Example 8 | 137.2 | 104.3 | 76.0 | 529.6 | 416.4 | 78.6 |
| Comparative Example 9 | 129.8 | 106.9 | 82.4 | 518.7 | 417.5 | 80.5 |
| Comparative Example 10 | 120.7 | 89.4 | 74.1 | 487.1 | 358.9 | 73.7 |
| Comparative Example 11 | 110.3 | 75.4 | 68.4 | 442.0 | 329.3 | 74.5 |

It is clear from Tables 1 to 3 that, when Examples 1 to 13 and Comparative Examples 1 to 11 are compared with each other, in the lithium ion secondary batteries of Examples 1 to 13, the ratio of the 0.1 CA discharge capacity measured at 0° C. to the 0.1 CA discharge capacity measured at 25° C. is 80% or more, the 0.1 CA discharge capacity measured at 0° C. is 120 mAh/g or more, the ratio of the mass energy density during 0.1 CA discharge at 0° C. to the mass energy density during 0.1 CA discharge at 25° C. is 80% or more, and the mass energy density during 0.1 CA discharge at 0° C. is 450° C. Wh/g or more. Thereby, it could be confirmed that the discharge capacities and the energy densities are high at a low temperature and at a high-speed charge and discharge.

On the other hand, it is also clear that, in the lithium ion secondary batteries of Comparative Examples 1 to 11, at least one of the ratio of the 0.1 CA discharge capacity measured at 0° C. to the 0.1 CA discharge capacity measured at 25° C. of less than 80%, the 0.1 CA discharge capacity measured at 0° C. of less than 120 mAh/g, the ratio of the mass energy density during 0.1 CA discharge at 0° C. to the mass energy density during 0.1 CA discharge at 25° C. of less than 80%, and the mass energy density during 0.1 CA discharge at 0° C. of 450 Wh/kg or less is satisfied. Thereby, it could be confirmed that the discharge capacities and the energy densities are low at a low temperature and at a high-speed charge and discharge.

In addition, regarding the amount of solid solution of Fe, as seen from the result of Comparative Example 3 as a case in which x is lower than 0.22, the charge and discharge capacity at 0° C. was 111.5 mAh/g, the charge and discharge capacity at 25° C. was 139.6 mAh/g, and the characteristics were low and below the determination standards.

As seen from the result of Comparative Example 2 as a case in which x is more than 0.35, the energy density at 0° C. was 441.4 Wh/kg, the energy density at 25° C. was 539.2 Wh/kg, and the characteristics were low and below the determination standards.

In contrast, in the lithium ion secondary batteries in which the amount of solid solution of Fe is in a range of 0.220≤x≤0.350, the characteristics of both charge and discharge capacity and energy density were above the determination standards.

Regarding the amount of solid solution of Co, as seen from the result of Comparative Example 5 as a case in which y is lower than 0.005, the activation energy was 57.34 kJ/mol and the characteristics did not correspond to the determination standard of "55 kJ/mol or less".

Further, as seen from the result of Comparative Example 4 as a case in which y is more than 0.018, the energy density at 0° C. was 441.8 Wh/kg, the energy density at 25° C. was 544.4 Wh/kg, and the characteristics were below the determination standards.

In contrast, in the lithium ion secondary batteries in which the amount of solid solution of Co and Zn is in a range of 0.0050.018, the characteristics of both activation energy and energy density were above the determination standards.

From the above, it could be confirmed that the present invention is useful.

Since the electrode material for a lithium ion secondary battery of the present invention includes an electrode active material made of $LiFe_xMn_{1-x-y}M_yPO_4$ (0.220≤x≤0.350, 0.005≤y≤0.018), in which the M is either or both of Co and Zn, a crystal structure is orthorhombic, a space group is Pnma, values of crystal lattice constants a, b, and c satisfy 10.28 Å≤a≤10.42 Å, 6.000 Å≤b≤6.069 Å, and 4.710 Å≤c≤4.728 Å, and lattice volume V satisfies 289.00 Å³≤V≤298.23 Å³, a lithium ion secondary battery with an electrode for a lithium ion secondary battery produced using this electrode material for a lithium ion secondary battery has a high discharge capacity and a high mass energy density at a low temperature or at a high-speed charge and discharge, and thus can be applied to next-generation secondary batteries anticipated to have a higher voltage, a higher energy density, higher load characteristics, and higher-speed charge and discharge characteristics. In the case of next-generation secondary batteries, these effects are extremely significant.

What is claimed is:
1. An electrode material for a lithium ion secondary battery comprising:
an electrode active material made of $LiFe_xMn_{1-x-y}M_yPO_4$ (0.220≤x≤0.350, 0.005≤y≤0.018),
wherein the M is either or both of Co and Zn, and a space group of a crystal structure in the electrode active material is Pnma, values of crystal lattice constants a, b, and c satisfy 10.28 Å≤a≤10.42 Å, 6.000 Å≤b≤6.069 Å, and 4.710 Å≤c≤4.728 Å, and lattice volume V satisfies 289.00 Å³≤V≤298.23 Å³.

2. The electrode material for a lithium ion secondary battery according to claim 1, wherein a ratio of a 0.1 CA discharge capacity measured at 0° C. to the 0.1 CA discharge capacity measured at 25° C. is 80% or more, the 0.1 CA discharge capacity measured at 0° C. is 120 mAh/g or more, and a ratio of a mass energy density during 0.1 CA discharge at 0° C. to the mass energy density during 0.1 CA discharge at 25° C. is 80% or more.

3. The electrode material for a lithium ion secondary battery according to claim 1, wherein a surface of the electrode active material is coated with a carbonaceous film, and an activation energy of an intercalation and deintercalation reaction of lithium ions occurring at an interface between the electrode active material and the carbonaceous film is 55 kJ/mol or less.

4. The electrode material for a lithium ion secondary battery according to claim 1, wherein the M is Co.

5. The electrode material for a lithium ion secondary battery according to claim 1, wherein an average primary particle diameter of primary particles of the electrode active material made of $LiFe_xMn_{1-x-y}M_yPO_4$ is in a range of 50 nm to 400 nm.

6. The electrode material for a lithium ion secondary battery according to claim 5, wherein the surface of the primary particles of the electrode active material made of $LiFe_xMn_{1-x-y}M_yPO_4$ is coated with a carbonaceous film, and a thickness of the carbonaceous film is in a range of 1 nm to 12 nm.

7. An electrode for a lithium ion secondary battery comprising:

an electrode collector; and an electrode mixture layer formed on the electrode collector, wherein the electrode mixture layer includes the electrode material for a lithium ion secondary battery according to claim 1.

8. A lithium ion secondary battery comprising:

the electrode for a lithium ion secondary battery according to claim 7.

* * * * *